May 6, 1952  E. L. SAWYER  2,595,303
ARTILLERY FIRE CONTROL CHART
Filed Sept. 30, 1949  13 Sheets-Sheet 3
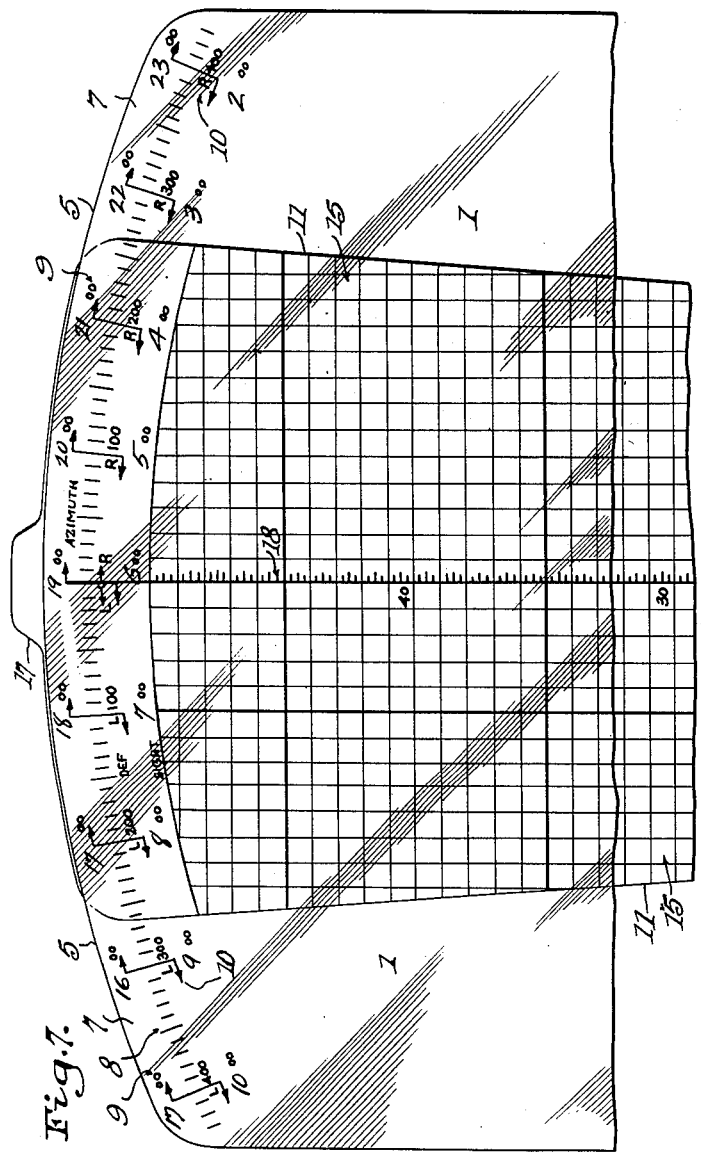
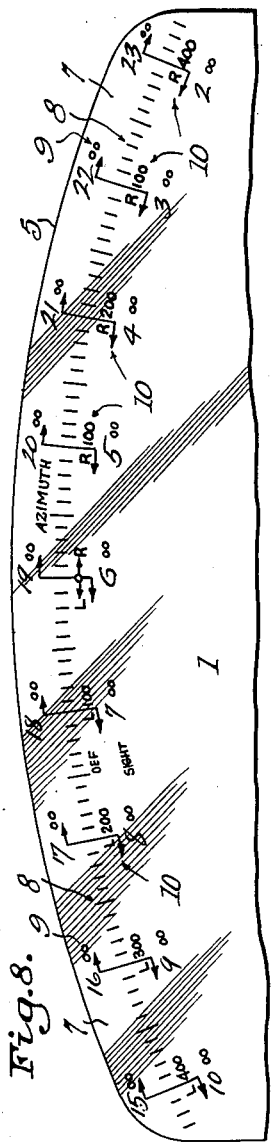
Inventor
Ephriam L. Sawyer
By Carlton C. Davis
ATTORNEY

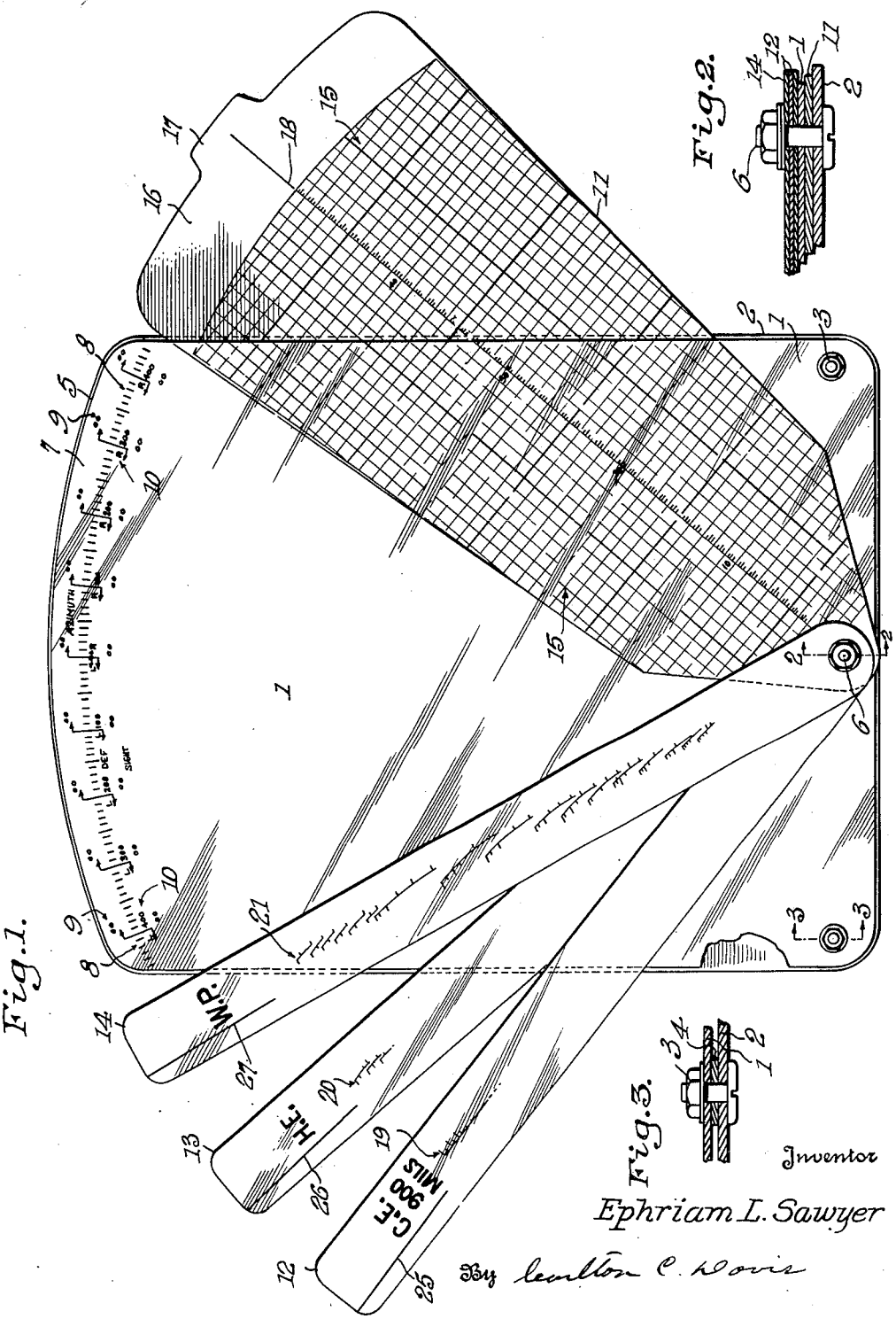

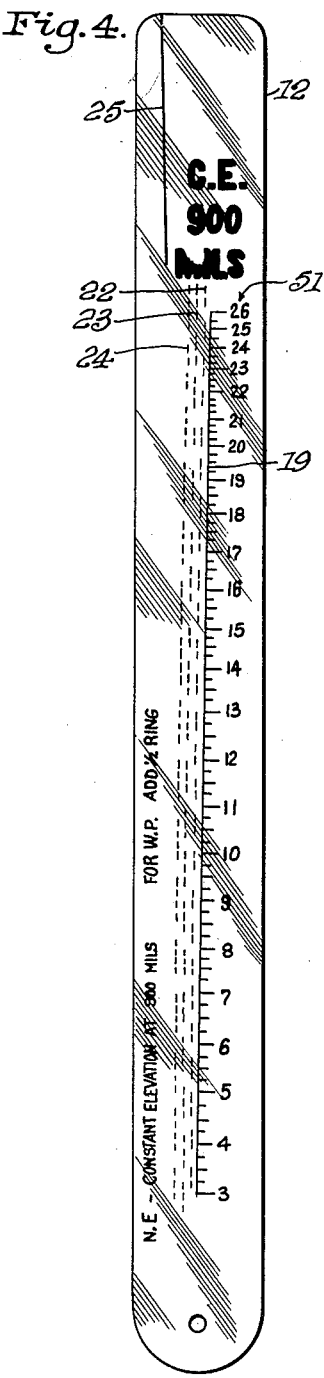

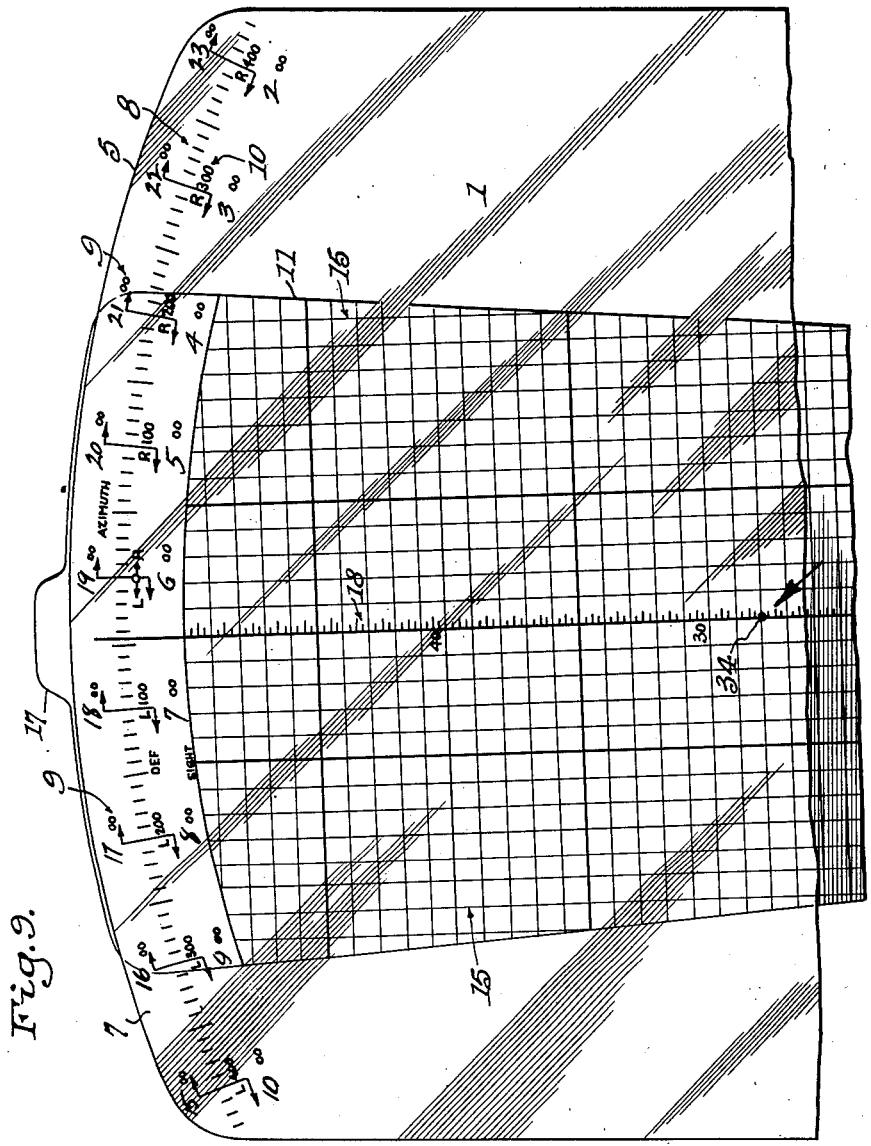

May 6, 1952     E. L. SAWYER     2,595,303
ARTILLERY FIRE CONTROL CHART
Filed Sept. 30, 1949     13 Sheets-Sheet 5
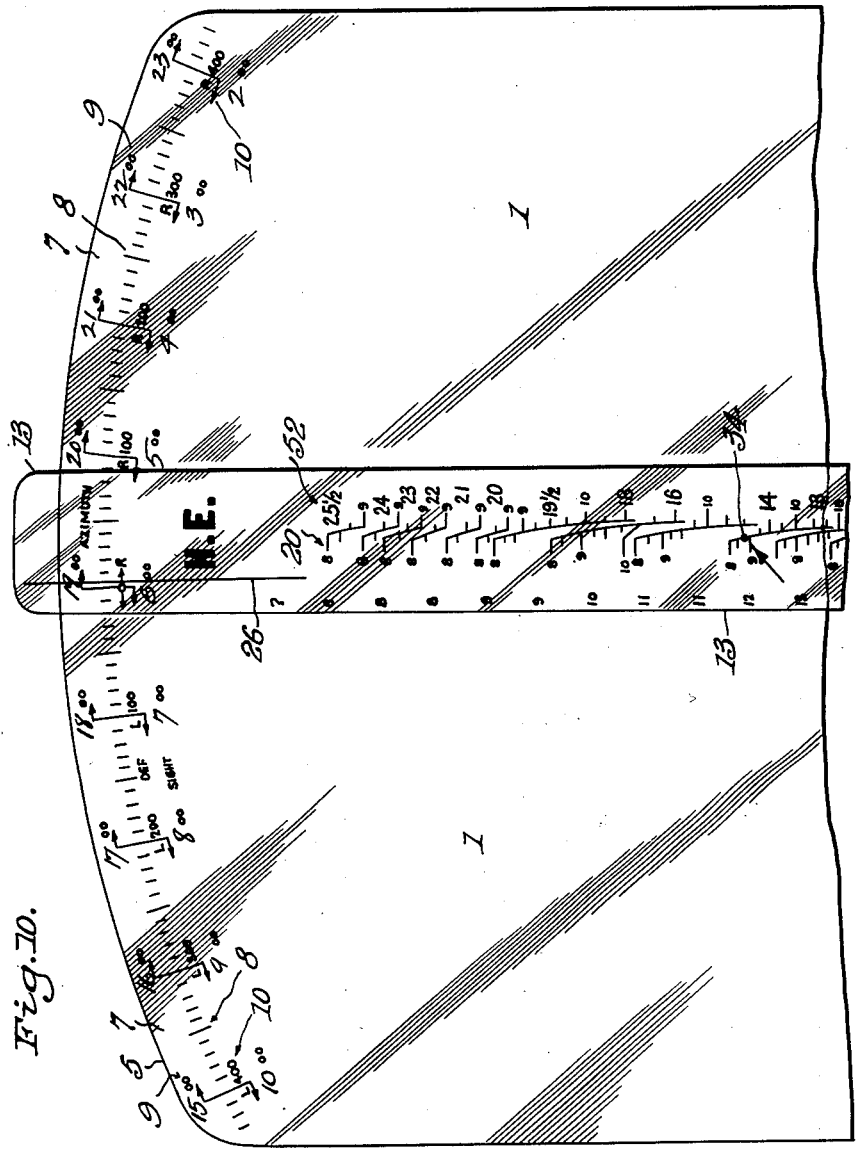
Inventor
Ephriam L. Sawyer
ATTORNEY May 6, 1952 E. L. SAWYER 2,595,303
ARTILLERY FIRE CONTROL CHART
Filed Sept. 30, 1949 13 Sheets-Sheet 6
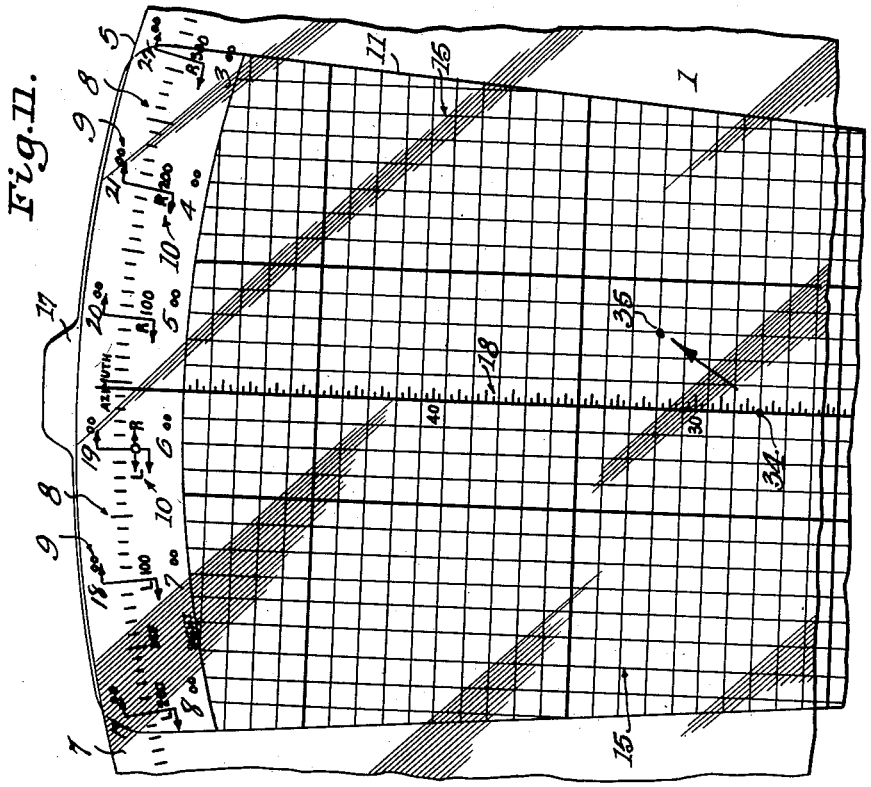
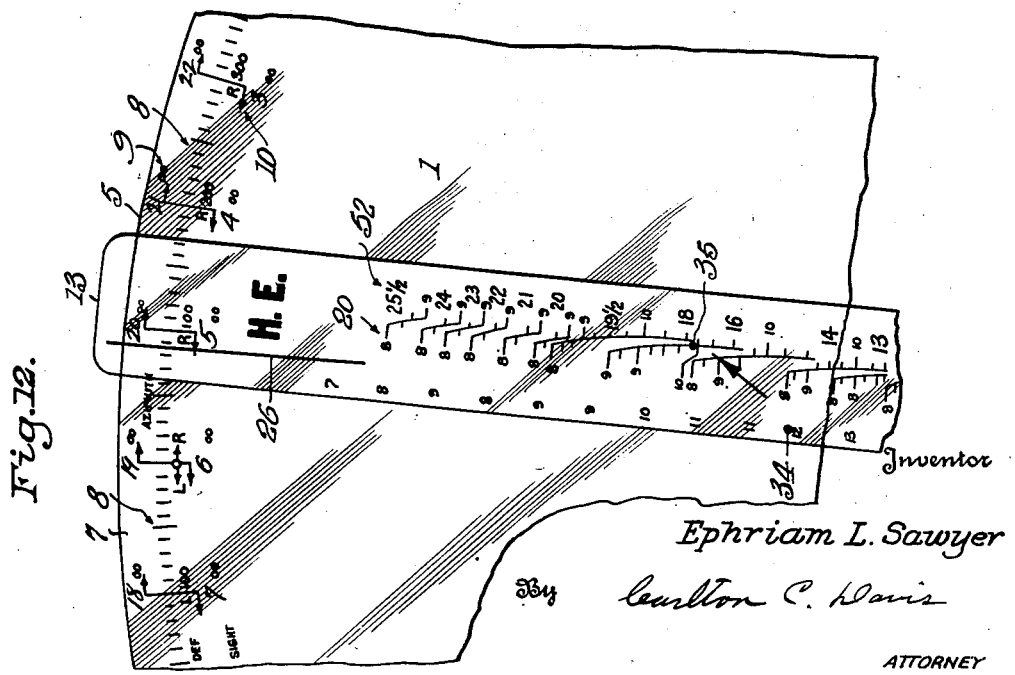
Inventor
Ephriam L. Sawyer
By Carlton C. Davis
ATTORNEY

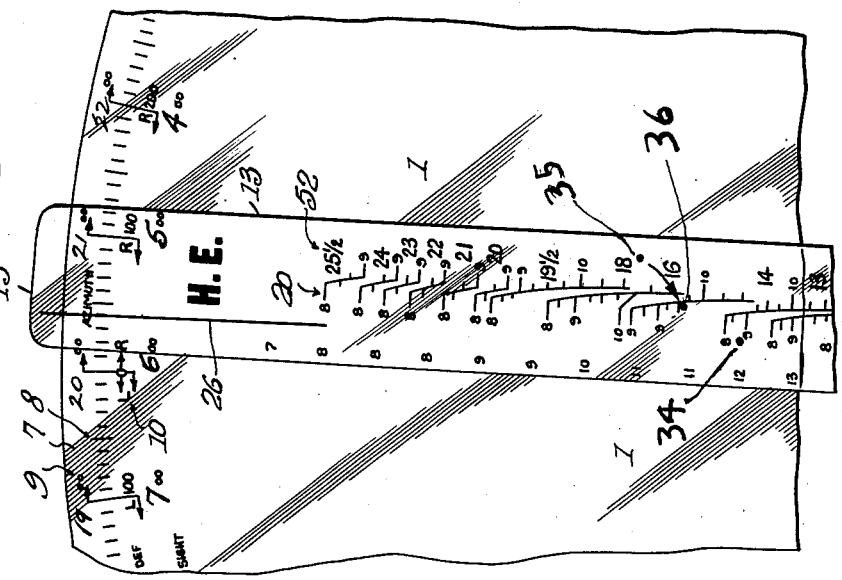
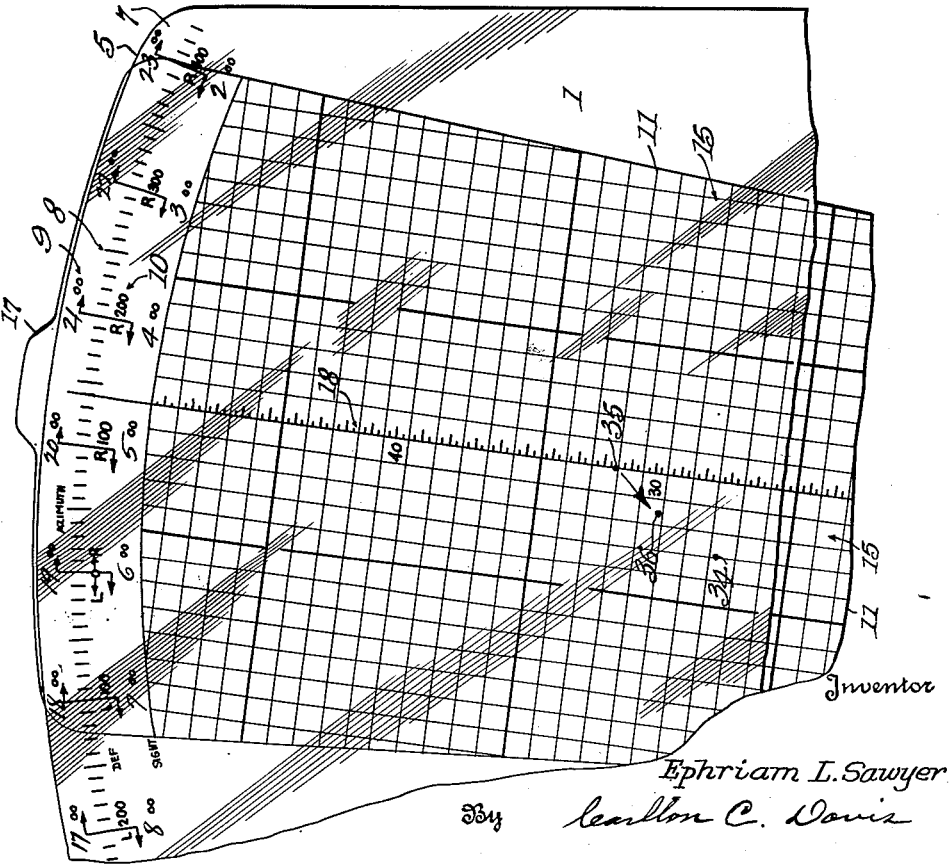

May 6, 1952      E. L. SAWYER      2,595,303
ARTILLERY FIRE CONTROL CHART
Filed Sept. 30, 1949      13 Sheets-Sheet 8
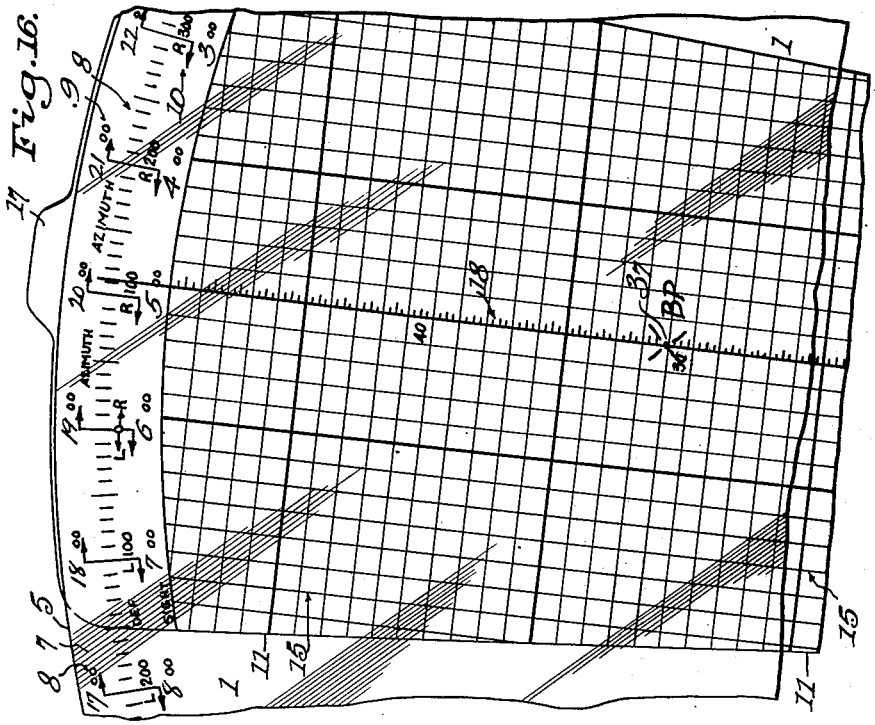
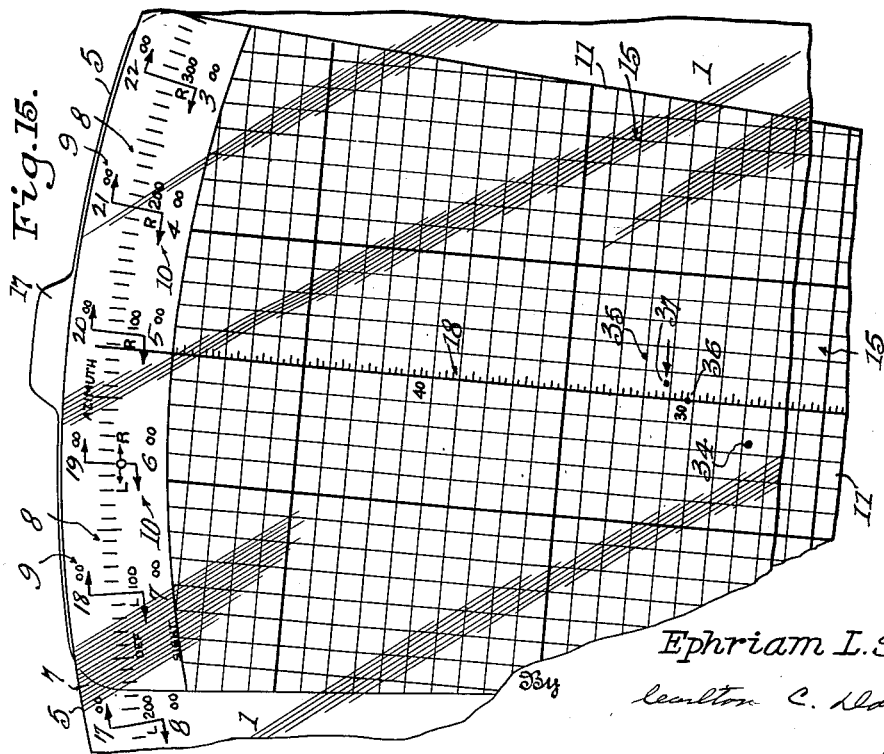
Inventor
Ephriam L. Sawyer
By Carlton C. Davis
ATTORNEY

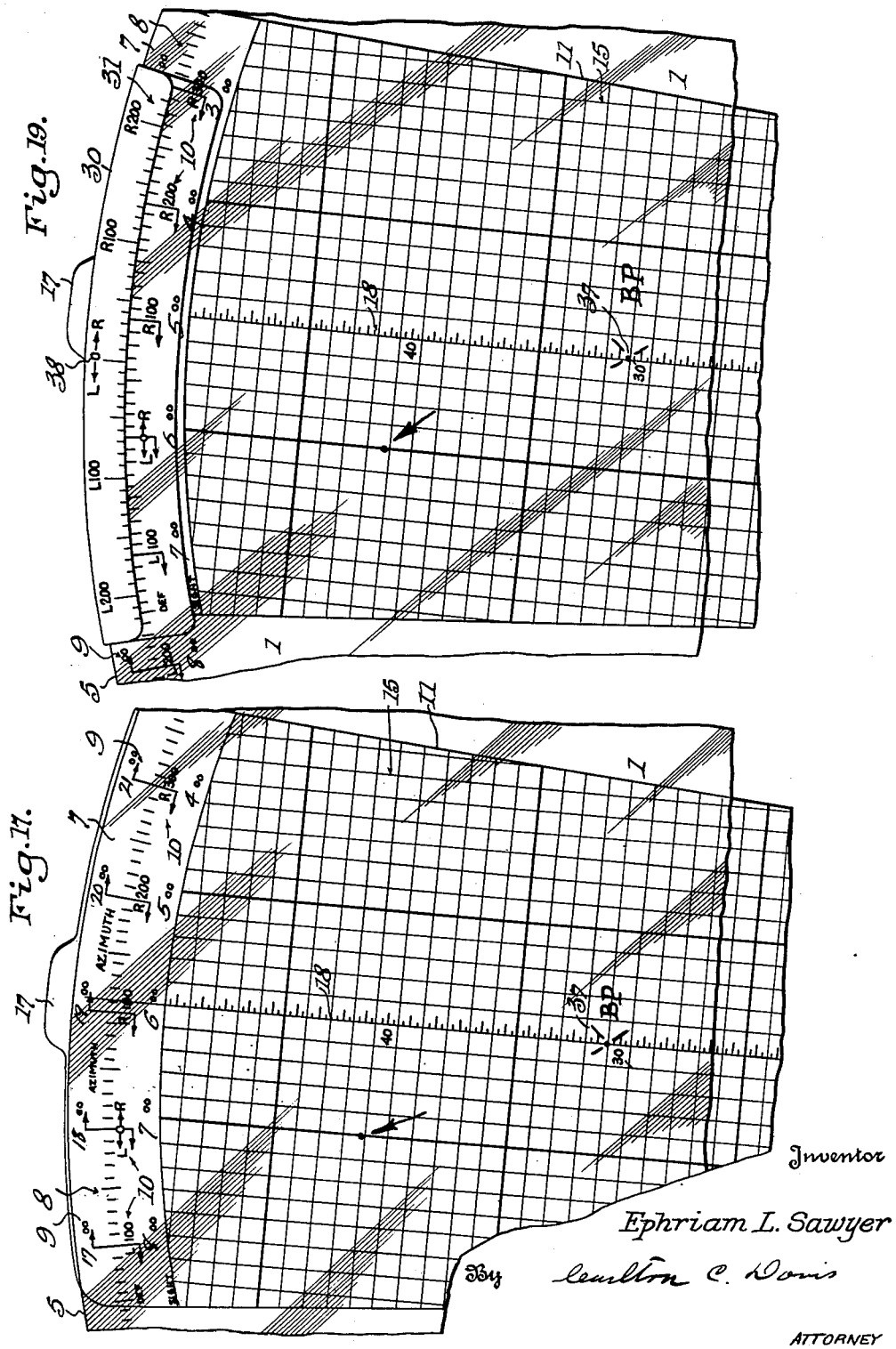

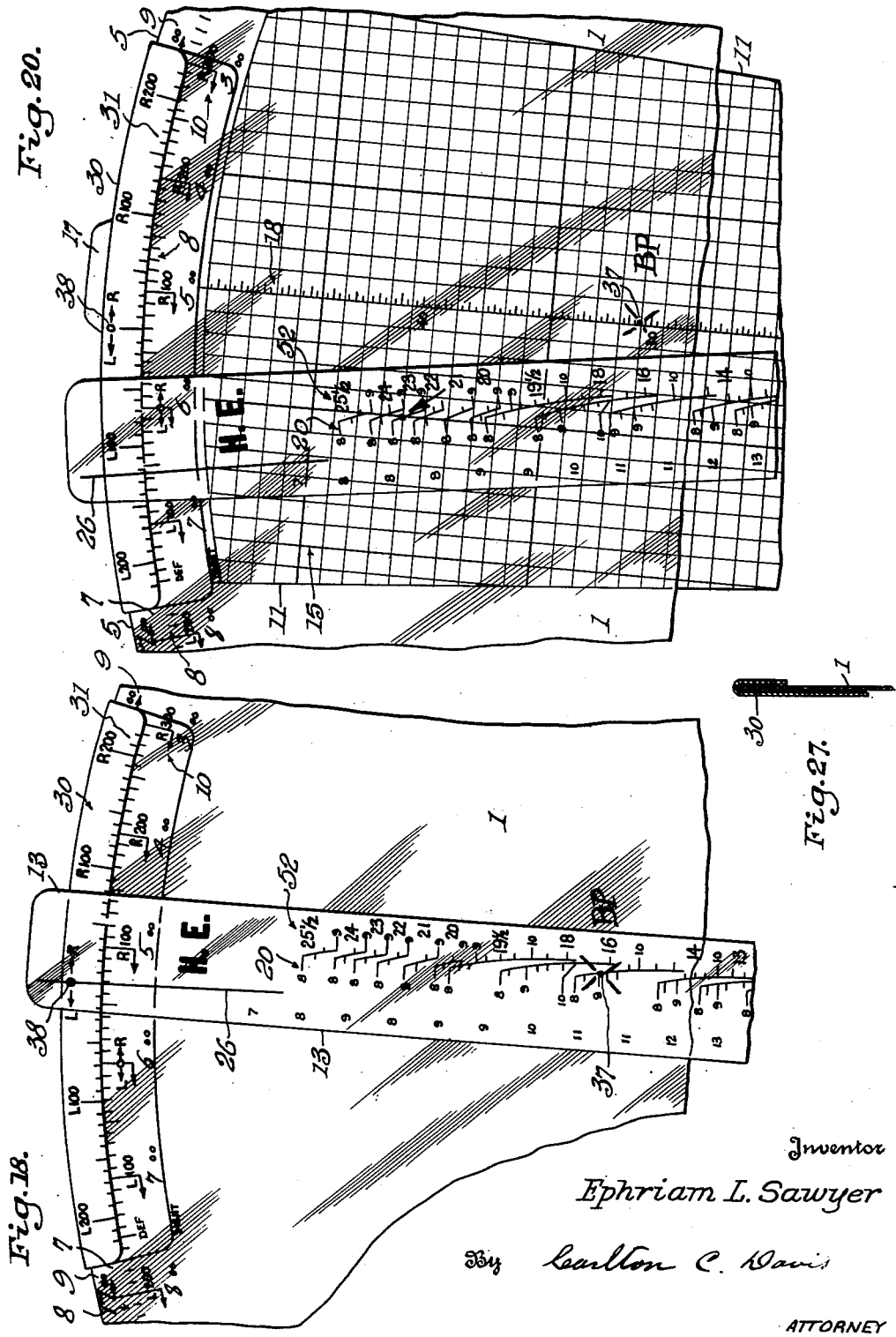

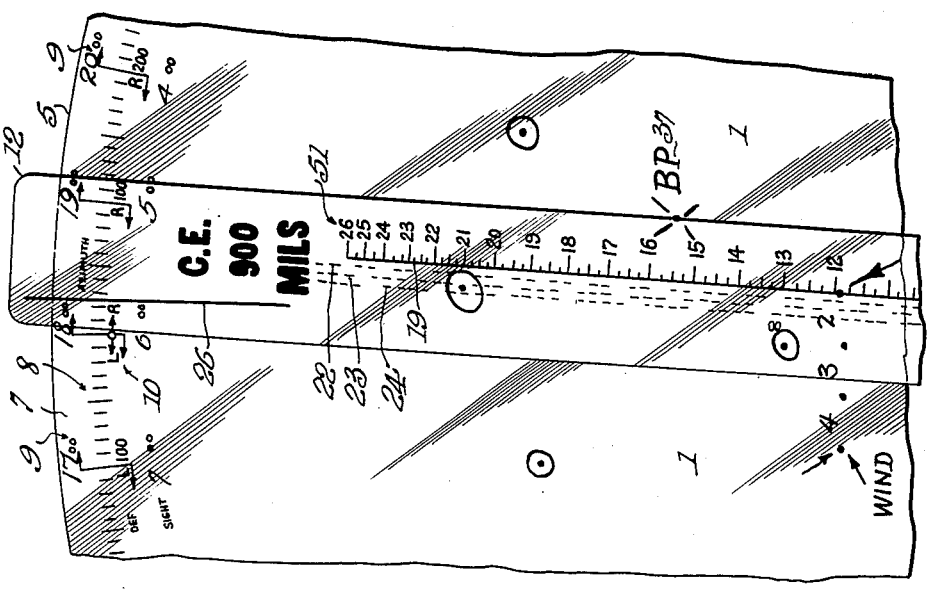
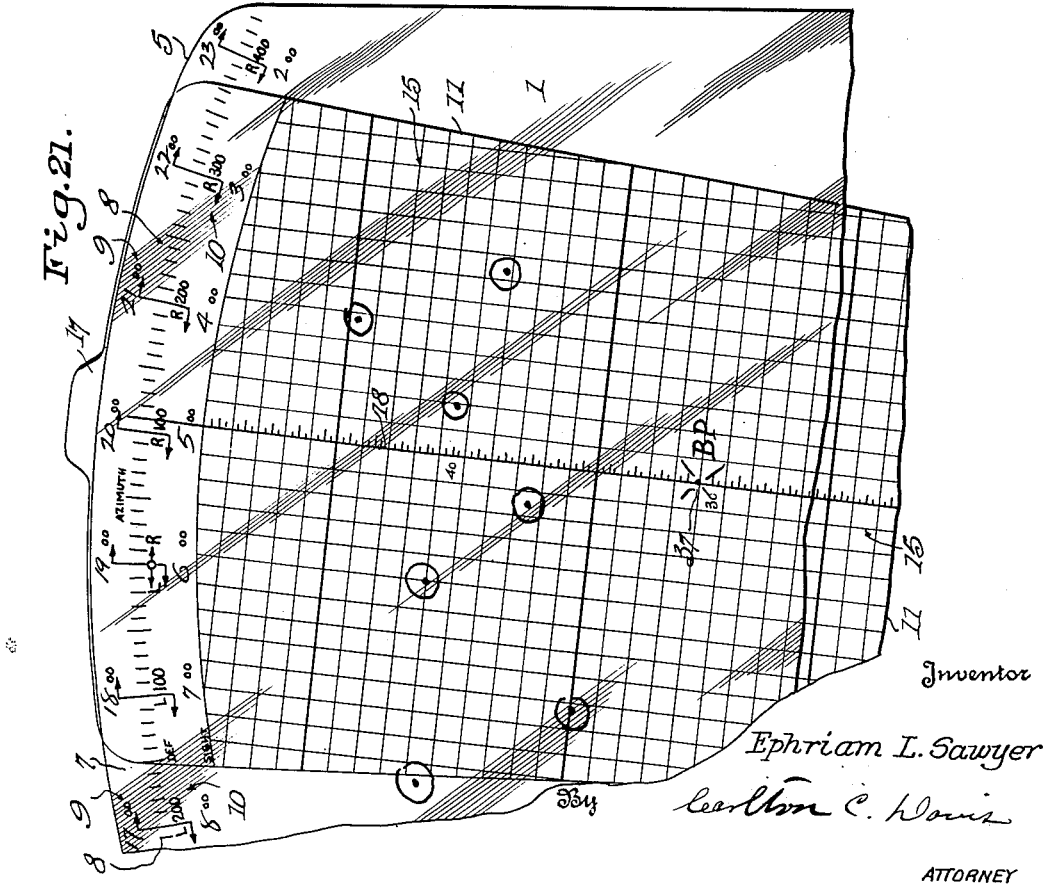

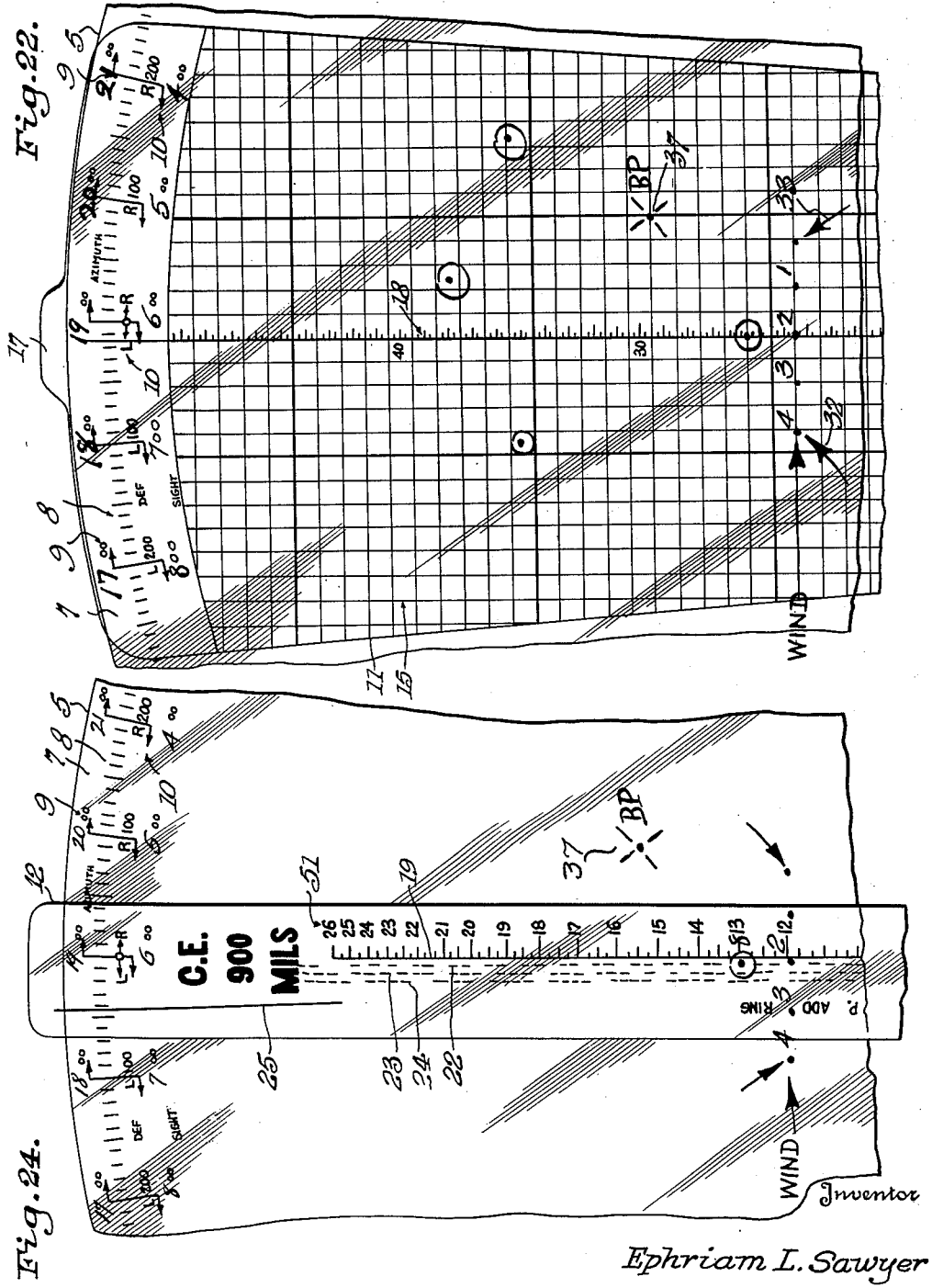

May 6, 1952  E. L. SAWYER  2,595,303
ARTILLERY FIRE CONTROL CHART
Filed Sept. 30, 1949  13 Sheets-Sheet 13
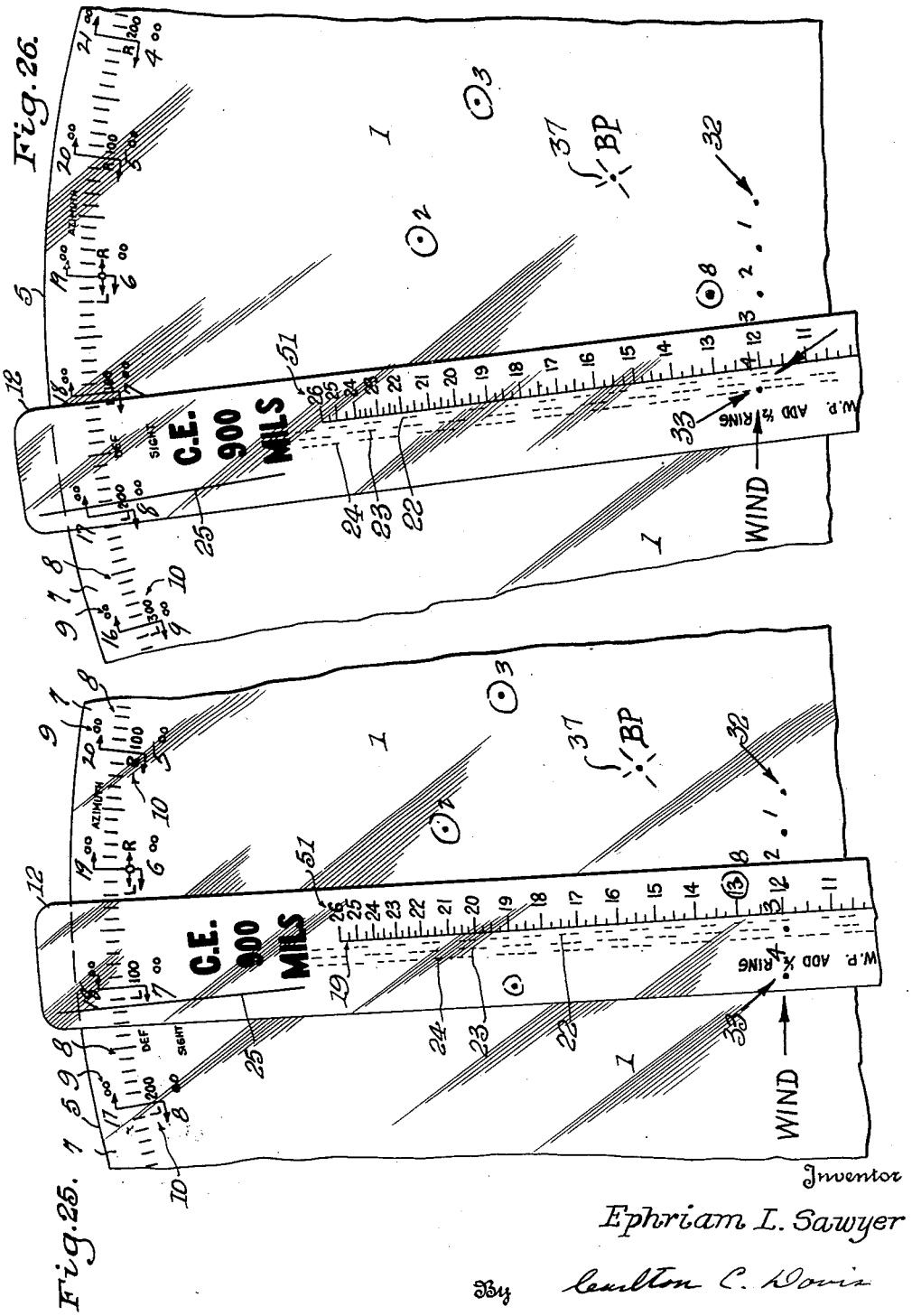
Inventor
Ephriam L. Sawyer
By Carlton C. Davis
ATTORNEY Patented May 6, 1952

2,595,303

UNITED STATES PATENT OFFICE 2,595,303

ARTILLERY FIRE CONTROL CHART

Ephriam L. Sawyer, Arlington, Va.

Application September 30, 1949, Serial No. 118,743

4 Claims. (Cl. 235—61.5)

(Granted under the act of March 3, 1883, as amended April 30, 1928; 370 O. G. 757)

This invention generally relates to an improvement in mortar fire control charts for artillery field pieces and to methods of operating the same and it is particularly adapted to be used in directing the fire of the United States Army 4.2-inch chemical mortar, a weapon which may be widely traversed and is designed for firing high explosive, incendiary, and smoke shells at ranges up to 5000 yards and may be modified to calculate data for firing at appreciably greater ranges.

This invention may be manufactured and used for and by the Government, for governmental purposes, without the payment to me of any royalties thereon.

The best fire control means heretofore used in directing the fire of the above mentioned weapons, hereafter referred to as "mortar," is the M27 graphical firing table which is a special type of wooden slide rule plotter provided with a slidably mounted indicator. Unfortunately this firing table is somewhat complicated in operation, may be worked rapidly and accurately only by skilled operators and its use involves mathematical calculations.

One object of this invention is to provide a novel fire control means which can be rapidly operated.

Another object is the provision of a fire control chart which is so simple in its construction and its method of operation that it can be used effectively by any new member of a mortar crew with but little previous instruction.

A further purpose is the provision of a chart of the character described which eliminates the necessity of making calculations each time a new target is indicated.

Other purposes of this invention will become apparent from the specification, claims, and drawing of this application.

In the drawing:

Fig. 1 is a top plan view of a preferred form of this invention.

Fig. 2 is a section taken along lines 2—2 of Fig. 1.

Fig. 3 is a section taken along lines 3—3 of Fig. 1.

Figs. 4, 5, and 6 are enlarged plan views of the shell impact curve scales shown in Fig. 1.

Fig. 7 is an enlarged plan view of the upper portion of the plotting sheet and sensing fan in Fig. 1.

Fig. 8 is an enlarged plan view of the upper portion of the plotting sheet showing a combination magnetic sight and deflection azimuth scale.

Fig. 9 is a fragmentary plan of the plotting sheet and the sensing fan of Fig. 7 which are used to locate a firing point on the plotting sheet. In this view, it is assumed that the target has been "sensed" or estimated by an observer at a magnetic azimuth of 1855 mils and at a range of 2800 yards and that the mortar is so laid that its base line traverses 600 mils on the sight scale.

Fig. 10 is a fragmentary plan view of the fire control chart illustrating how the firing data is obtained for the firing point located in Fig. 9 by pivoting the HE (high explosive) impact curve scale over the plotting sheet until one of the firing impact curves is brought into registration with the firing point. The data obtained is: "14 HE ammunition rings, elevation 890 mils, deflection 596 mils."

Fig. 11 is another plan view of the chart showing how a second firing point is located on the plotting sheet after the mortar has been fired in accordance with the above mentioned firing data and the impact of the first shell has been sensed or estimated to be 300 yards to the left and 400 yards short of the target.

Fig. 12 is a fragmentary plan view of the chart showing how new firing data may be obtained by placing an impact curve of the HE impact scale in registration with the second firing point located in Fig. 11. Here the indicated data is "18 rings, elevation 990 mils, deflection 514 mils."

Fig. 13 is a fragmentary plan view showing how the sensing fan is used to plot or locate a new firing point after a new firing command, "left 150 yards, drop 200 yards," has been given.

Fig. 14 is a plan view illustrating how the firing data is obtained in accordance with the firing command of Fig. 13 by registering one of the impact curves of the HE impact scale on the firing point located in Fig. 13. Here the data indicated is: "16 rings, elevation 960 mils, deflection 560 mils."

Fig. 15 is a fragmentary plan view of the fire control chart showing how, by additional sensing, new firing points can be plotted during a fire mission.

Fig. 16 is a fragmentary plan view of the chart illustrating how the azimuth and range of the base point of the mortar indicated by arrow in Fig. 15, is located and recorded on the plotting sheet. Data is assumed to be "Azimuth 2012 mils, range 3100 yards."

Fig. 17 is a fragmentary plan view of the fire control chart illustrating how the sensing fan is used by reference to the base point of the mortar in locating a new firing point. Here the command is: "from base point, left 500 yards, add 1,000 yards."

Figs. 18, 19, and 20 are fragmentary plan views of the firing chart illustrating, by example, how the shift indicator is applied to the top of the plotting sheet to obtain the deflection shift data needed for traversing the mortar from its base point to the new firing point of Fig. 17. In these views the shift indicator is slipped over the top of the plotting sheet and is adjusted in Fig. 18; the new point is plotted in Fig. 19; and the data: "23 rings, left 125 mils, elevation 825 mils," is indicated in Fig. 20.

Fig. 21 is a fragmentary view of the chart showing a number of fire concentration points recorded for future use on the plotting sheet.

Fig. 22 is a fragmentary plan view of the chart of the invention and illustrates how the plotting sheet and sensing fan of this chart are used in locating a firing point for a smoke screen. In this view the firing command is that the smoke screen be laid 200 yards short of a designated concentration point on the chart.

Figs. 23, 24, 25, and 26 are plan views showing how the CE (constant elevation) impact scale is used in obtaining the fire data for the smoke screen firing points located in Fig. 22, and, Fig. 27 is a cross sectional view of the shift indicator scale shown in Figs. 18, 19, and 20.

There is shown and described in this application only one fire control chart which embodied this invention. This chart makes use of a plurality of pivotally connected plastic members including a plotting sheet having an arcuate azimuth scale, an opaque sensing fan having a block of preferably green artillery squares imprinted thereon and three elongated transparent strips having shell impact lines or curves and other imprinted ballistic data thereon which has been especially computed and prepared for the United States Army 4.2-inch chemical mortar.

It being obvious that corresponding scales, squares, curves and other ballistic data can be similarly prepared for the particular use of other types of artillery field pieces, it will be understood that the appended claims are not limited to a chart solely adapted for use with this mortar, except when the claims so specify.

This invention may also, and preferably does, make use of a stiff opaque baseboard rigidly secured to the plotting sheet in a manner whereby the sensing fan may be freely and pivotally moved between the baseboard and the plotting sheet in order that the military squares on the sensing fan may be readily seen through the plotting sheet and firing points may be located and marked on the plotting sheet in accordance with the data provided by the artillery squares on the sensing fan.

The preferred forms of the plotting sheet 1 and the stiff baseboard 2, are preferably of substantially the same size and shape except that the baseboard may be thicker. Each are preferably rectangular in shape except that their top edges are in the form of an arc, the center of which is in the center of the top edges. The upper surface of the plotting sheet as seen in Fig. 1 is roughened in any suitable manner to receive pencil or crayon marks and the plotting sheet is secured in a spaced apart relationship to the baseboard by any suitable bolting means 3, which is provided with spacer washers 4, in order that a space may be provided between the plotting sheet and the baseboard in which the above mentioned sensing fan may be moved between the plotting sheet and the baseboard. The plotting sheet is perforated in its lower portion at a point directly opposite to the center of its top edge 5, to receive a suitable bolt and nut means 6, which pivotally secures the sensing fan beneath and the three hereinafter described elevation impact curve scales shown in Figs. 4, 5, and 6, above the plotting sheet in the manner shown in Fig. 1.

A graduated combination magnetic azimuth, deflection and sight scale is imprinted on the plotting sheet a short distance from the tops of this sheet in order to provide a marginal blank space 7. The graduations on this arcuate scale 8, are made by long one hundred mil graduation marks and short ten mil marks and this scale has a range of four hundred and fifty mils both to the right and left of its center. The long one hundred mil marks are provided at their upper ends (see Fig. 7) with black arrows 9, which point to the right of the scale and at their lower ends with red arrows 10, which point to the left of the scale. Near each of the red and black arrows double zero (00) symbols are imprinted on the plotting sheet as a matter of convenience to the plotter who writes in the one hundred mil numerals with a crayon or pencil.

In order to aid the plotter in operating this chart the upper portion of this scale is marked by the word "azimuth," and is referred to as the magnetic azimuth scale, the mid-portion of the scale is marked by the word "deflection," and is referred to as the deflection scale, and the lower portion of the scale is identified by the word "sight," and is referred to as the sight scale.

The numbers written in at the one hundred mil intervals on the magnetic scale represent the earth's magnetic azimuth of the long graduation marks with respect to the position of the mortar laid in the direction of the field of fire. The number on the center one hundred mil graduation mark on the magnetic scale always indicates approximately the magnetic azimuth of the center target line of the mortar. In the examples illustrated on this application this azimuth is assumed to be 1900 mils. These azimuth numbers 15 00 to 23 00, therefore, increase from left to right with the number 1900 at the center of the scale.

Azimuthal numbers are also written in the deflection scale with the central one hundred mil interval being marked zero and the numbers increase to four hundred on either side of the central number. For convenience in rapid identification the red arrows in the deflection scale are preferably marked "L" and "R" substantially as shown to indicate their position with respect to the central long graduation mark since the central mortar target line (sometimes hereinafter referred to as the MT line) is not deflected. Azimuthal numbers 200 to 1,000 are similarly placed on the sight azimuth scale and increase as they are read from right to left. These letters are marked with the letter "L" on the left hand side of the scale and with the letter "R" on the right hand side to better indicate their position on the scale.

The sensing fan 11, has a white opaque surface which renders its artillery squares clearly visible but each of the impact curve scales, 12, 13, and 14, are made of preferably highly transparent sheet material to the end that the firing point on the plotting sheet will be clearly seen when the appropriate impact scale curve is brought into registration with the firing point which is indicated by a dot (.) marked on the drawing sheet in a manner yet to be described (see Fig. 18).

The sensing fan 11, is a somewhat wedge shaped strip upon which is printed a preferably green block 15, of artillery squares, each of which represent 100 square yards on the target area and on the plotting sheet. The blank top portion 16, of the sensing fan is preferably provided with an integral thumb tab 17, in order that the sensing fan may be readily moved beneath the plotting sheet by the fingers of the operator. Through the center of the imprinted main portion 15, there is printed a straight line 18, preferably red, which extends into the upper blank portion of the fan for a distance sufficient to reach the azimuth scale 8. The line 18 represents the MT (center sight of target) line of the mortar. This MT line 18, is divided into segments for a distance representing 5,000 yards on the plotting sheet, by long graduation marks representing 100 yards; intermediate graduation marks representing 50 yards; and short graduation marks representing 25 yards. Each 1,000 yard interval on the MT line 18, is also indicated by appropriate numerals.

The CE impact scale 12 (see Fig. 4) is specifically designed for use in firing the mortar at a constant elevation of 900 mils, and the scale is labeled accordingly. It is to be understood, however, that other CE impact scales, appropriately labeled, may be provided for use when firing other mortars or artillery weapons at any desired constant elevation. This scale has a continuous straight line curve 19, which is preferably black and extends longitudinally on the scale and is provided for the use of the Number 1 mortar of a battery.

The straight line curve 19, on the scale 12, is divided into quarter propellant ring segments by a number of long, medium, and short graduation marks. To the right of, and parallel to line 19, there is provided a row of numbers 51, preferably printed in red, for the purpose of indicating the number of propellant rings to be fired. To the left of line curve 19, there is also provided a series of three broken-line red impact curves 22, 23, and 24. These are formed respectively of a series of two, three, and four dashes, which are used to obtain data for mortars 2, 3, and 4, respectively. In operation, the impact line curve 19, is used when the Number 1 mortar of a battery is fired at a constant elevation. The broken line impact curves 22, 23, and 24, are used when firing the Numbers 2, 3, and 4 mortars of the battery at a constant elevation.

Here it may be noted that numerous impact curves in rows 20 and 21 are provided on both the HE and WP impact scales respectively (see Figs. 5 and 6). These curves are somewhat oblique, short, and incline upwardly to the left in contradistinction to the continuous line curve 19, and the broken-line curves 22, 23, and 24 on the CE scale which are all long straight curves. The reason for this difference is that the CE scale is used in firing at constant elevation, whereas the HP and WP are used in firing at various elevations.

Straight indicator lines 25, 26, 27 are printed on the upper left portion of each of the CE, HE and WP strips respectively (see Figs. 4, 5, 6) for the purpose of indicating, in mils, the traverse, shift or deflection which must be made by the mortar when the mortar is to be fired at any new given firing point, or is to be shifted from its base point or mortar target line a predetermined number of mils. Each of these shift indicator lines preferably extends to the azimuth scale to the end that the number of mils the mortar must be shifted in order to fire at any new firing point may be more accurately determined by the plotter.

Each of the impact curves in the rows 20 and 21 of the HE and WP impact scales 13 and 14 (see Figs. 5 and 6) is calibrated at 100 mil elevation intervals; and (except when the curve is too short) at the 50 and 25 mil elevation intervals. For convenience in reading, these 100 mil graduation marks bear identifying numbers which are printed either on the right or the left of the graduation marks on the shell impact curves according to the space available.

To the right of the rows of the impact curves on the CE, HE and WP scale is provided a row of numbers, 51, 52, 53, the numbers of which are so located on the scale strip as to indicate the number of propellant rings to be charged when the mortar is to be fired at the indicated range and elevation.

If desired, the left side of the CE, HE and WP impact scales may also be imprinted with other suitable data, with instructions (see Figs. 4, 5, and 6) which indicate the shift in the mils for each 33⅓ yards from the mortar to the target when designated types of shells are used.

All of the previously described elements of this invention are pivotally secured together. The fire control chart, however, also preferably makes use of a separate member 30, an opaque shift indicator (see Fig. 27) which is slipped on the top of the plotting sheet and moved over its arcuate top edge of the plotting sheet when carrying out certain steps of the method of this invention in a manner which is illustrated in Fig. 19. This shift indicator is preferably made of a plastic block or sheet, which may be formed in the shape of a J and has an arcuate mil graduation mark both right and left of the center of an arcuate scale 31, provided on the shorter end of the scale.

METHOD OF OPERATION

The fire control chart of this invention is used by plotters or computers of the battery fire direction control, by the platoon executive or recorder at the platoon firing position, and by forward observers, to obtain data for the 4.2-inch chemical mortar far more rapidly than is possible with the M37 graphical tables. It serves as a most convenient means for plotting the data, recording and interpreting it.

Since this control chart is designed to serve many purposes its method of operation can be adequately explained only by providing a plurality of illustrative examples, some of which have been referred to in the description of the chart of this invention.

The normal preliminary procedures which are necessary before obtaining and computing the data must now be explained and described although it involves an amplification of much that has been previously stated.

The leader of a reconnaissance party locates a platoon position by ground or map reconnaissance and determines the azimuth on which the base mortar is to be laid.

For convenience in using the fire control chart, the base mortar is preferably first laid at the even 100 mil magnetic azimuth closest to the MT line. An aiming stake for the base mortar is then set at an even 100 mil sight deflection and the other mortars of the battery are laid parallel to the first mortar. Then aiming stakes are set for each other mortars at the same sight deflection and all the mortars are traversed so that they are laid on this MT line. For example, if the azimuth of the chosen MT line is 1875 then the base mortar is first laid at the nearest 100 mil graduation and this mark is numbered 1900 at the center black arrow. After the base mortar is laid, the other mortars are laid parallel therewith and all mortars are traversed with their traversing screws to azimuth 1875.

At the upper end of scale 8, for each black arrow to the right of center, add 100 mils; for each black arrow to the left of center, subtract 100 mils. At the lower end of the 100 mil mark on this scale, for each red arrow to the left of the center, add 100 mils; for each red arrow to the right of center, subtract 100 mils (see Fig. 8).

The azimuth and range of a firing point, base point, target or concentration, are recorded on plotting sheet 1 by means of a soft black or colored pencil (see Figs. 9 and 15). The target or firing point is located from data furnished by the forward observer, or fire direction center, using the sensing fan 11. The point is recorded by making a dot (.) on the plotting sheet (see Figs. 9, 11, 13 and 15). The base point is located by actual firing, and is recorded on plotting sheet 1 by marking four radiating lines around the dot previously made (see Fig. 16). Concentration is recorded on the plotting sheet by making a small circle (⊙) around the point representing the target, and numbering it (see Fig. 21).

Use of sensing fan

The sensing fan 11 is used to locate a point or target, and to measure deviations from the point or target on the plotting sheet (see Figs. 9, 11, 13, and 15). In locating a point, the azimuth and range of the point are sensed and transmitted by the observer in any suitable manner such as phoning: "azimuth 1855 mils, range 2800 yards." Assuming this to be the data provided, the MT line 18 is alined with 1855 mils on the azimuth scale 8 of plotting sheet, interpolating as necessary. A point representing 2,800 yards is then selected on the MT line of the underlying sensing fan, and a pencil dot (.) is marked on the plotting sheet 1 (see Fig. 9). Based on observed deviations from a point or target, corrections are furnished by a forward observer. If, for example, the corrections are: "from base point, right 300 yards, add 400 yards." The MT line 18 of sensing fan 11 is alined under the dot representing the base point and a new point is located on sensing fan 11; and is recorded on plotting sheet 1 by measuring 300 yards (3 artillery squares) to the right of the MT line and 400 yards (4 artillery squares) up the MT line (see Fig. 11). All measurements are, of course, made at right angles or parallel to this line.

Use of constant elevation impact scale

The CE impact scale 12 may be used to register on a base point, or to fire on targets of opportunity. When the mortars of a platoon are fired in parallel sheaf, at an elevation of 900 mils, the CE impact scale 12 is so placed that the impact line, representing the base mortar (usually the No. 3 mortar) is directly over the point located on the plotting sheet in the same manner (see Fig. 23) used in solving a smoke screen problem. Firing data for the platoon are then determined. The ring charge is obtained for mortar No. 1 from the figure, in row 21, at the right of the point and the line 19. The deflection is obtained from the scale 8, on the plotting sheet, at the point where the shift indicator line 25 of the scale intersects it, interpolating as necessary in the same manner as is shown in Fig. 23 in working out the smoke screen problem.

In closed sheaf firing at a constant elevation of 900 mils, that is when the mortars of a platoon are closed on a point, the CE impact scale 12 is moved so that the impact line curves 19, 22, 23, and 24, representing the various mortars of the platoon, are consecutively placed over the point (.) located on the plotting sheet. Firing data for each of the mortars are then determined.

In open sheaf firing, that is, when the mortars of a platoon are opened on a front, the limits of the target front and of the sectors assigned to each mortar must be plotted on plotting sheet using the sensing fan as shown. The CE impact scale 12 is moved so that the impact line curves 19, 22, as, and 24, representing the various mortars, are in turn placed over each of the assigned sectors. Firing data for each of the motars are then determined as previously described.

To illustrate by exemplification: in an open sheaf problem, let it be assumed that the forward observer has transmitted the following fire command: "Fire mission; smoke screen; from concentration 8; right limit—right 400 yards, drop 200 yards; left limit—left 400 yards, drop 200 yards." Concentration 8 (see Fig. 22) is located at azimuth 1883 mils, range 2,600 yards. The limits of the smoke screen are located on the plotting sheet by two arrows, 32, 33 as shown in this figure. The target front is divided into four parts and a sector is assigned to each of the mortars by placing mortar numbers, 1–4, above the respective sectors, as shown. The CE impact scale 12 which registers with these four parts as the largest front is calibrated for HE ring charges, therefore, one-half ring must be added to the reading for WP.

The computer determines firing data for each of the mortars, (see Figs. 23 to 26, inc.), which is assumed to be as follows: "Smoke screen; WP; 12½ rings; deflection—No. 1 mortar; 572 mils (see Fig. 23); deflection—No. 2 mortar; 648 mils (see Fig. 24), deflection—No. 3 mortar; 718 mils (see Fig. 25); deflection—No. 4 mortar; 790 mils (see Fig. 26); elevation 900 mils." The firing data for each mortar are so determined that the rounds fall to the upwind side of the assigned sectors. The forward observer may make corrections by sensing for individual mortars, or for the platoon.

Use of variable elevation impact scale

The various impact scales are used to determine data, from points plotted on the plotting sheet 1, for transmittal to the firing platoon. The variable elevation, HE and WP scales are so placed that one of the impact curves in their impact curve rows, is directly over a point located on the plotting sheet. Firing data for the mortar platoon are then determined (see Figs. 10 and 12). The propellant ring charge is obtained by reading the figure, in the row of propellant ring numbers, opposite the impact curve (see Figs. 5 and 6). The sight deflection is obtained from the lower part of scale 8 of the plotting sheet, at the point where the impact line indicator of the impact scale intersects it, interpolating as necessary. The elevation is obtained (interpolating as may be necessary) from the impact curve which registers with the firing or concentration point.

While platoon personnel prepare mortar positions, the forward observer selects an observation post, and a point in the field of fire to be the base point. By any approved method, he determines the estimated range and azimuth of that point to the base mortar. The point thus selected will become the base point, after the base mortar has registered on it. The estimated azimuth on which the base mortar is laid is first assumed to be 1900 mils; and the sight deflection of the aiming stakes is assumed to be 600 mils. These numbers are recorded on the fire control chart as shown in Fig. 7. The azimuth scale 8 is now completed as shown in Fig. 8 and the first point 34 is located with the sensing fan as indicated in Fig. 9.

For example: firing data for the initial point 34 located on the plotting sheet as outlined in the preceding paragraph, are determined by placing the HE impact scale 13 so that one of the impact curves in row 20 is directly over the point 34. Data, obtained as previously described, are assumed to be: "14 rings, deflection 596 mils, elevation 890 mils" (see Fig. 10). The forward observer senses the initial round fired as being 300 yards to the left and 400 yards short of the point being fired upon. He transmits a firing command giving these corrections.

The second point 35, is plotted on plotting sheet I (see Fig. 11). Firing data for the base mortar, as determined, are assumed to be: "18 rings, deflection 512 mils, elevation 995 mils" (see Fig. 12). After another round is fired, let us assume the forward observer transmits a command giving corrections, "left 150 yards, drop 200 yards."

The third point 36 is plotted (see Fig. 13). Firing date, as determined, are assumed to be: "16 rings, deflection 560 mils, elevation 960 mils." Assume another round is fired and the forward observer senses the shell impact and transmits a command giving corrections, which are assumed to be: "right 50 yards, add 100 yards."

The fourth point 37 is plotted (see Fig. 15). Firing data are determined as previously described. Firing is continued until a target hit is obtained, or the adjusted range is determined by any of the approved procedures. Assume that the last round fired (and the first round fired on point 37) was a target hit. The forward observer transmits a command which is assumed to be: "registration complete, record base point." The computer at the fire-direction center marks the base point on the plotting sheet so that it will be easy to identify, and erases all other points plotted while registering. He then determines the range and azimuth to the base point by use of the sensing fan II (see Fig. 16), and reports: "Red platoon base point registered, azimuth 2010 mils, range 3,110 yards."

After the base point 37 has been plotted on the plotting sheet I, firing data for targets of opportunity can be quickly determined.

For example: the forward observer transmits a fire command which is assumed to be: "Fire mission, from base point, left 500 . . . and 1,000 . . . , enemy troop concentration.". The target 38 is plotted on the plotting sheet (see Fig. 17). Firing data are determined as previously described, transmitted to the firing platoon, and are assumed to be: "Fire mission; 23 rings; deflection, left 650 mils; elevation 830 mils."

*Use of shift indicator*

The shift indicator 30 (see Figs. 17 to 20 inc.) can be used to determine a deflection shift from a registered point, such as a base or concentration plotted on the plotting sheet. It can also be used to determine the deflection shift for a mortar using an individual aiming point. After a point has been registered and plotted on the plotting sheet I, one of the impact scales is alined over the plotted point . . . The shift indicator 30 is slipped over the top edge of the plotting sheet I and its zero line . . . is alined with the impact line indicator of the impact scale (see Fig. 18). The deflection shift from the registered point to a target can then be determined directly from the shift indicator (see Fig. 20). The correction shift for any correction ordered by the forward observer is read from the shift indicator scale. It is applied to the sight setting of the last round fired. The shift indicator is reoriented in a similar manner after each round fired. Firing data for targets of opportunity can be quickly determined, using the shift indicator to determine deflection shifts from the base deflection.

For example: the base point has been plotted at azimuth 2,010 mils, range 3,110 yards, as previously described. The HE impact scale is oriented over the plotted base point, as previously described. The shift indicator is slipped over the top edge of the plotting sheet I, so that its zero line 38, is alined with the impact line indicator 26, of the impact scale 13 (see Fig. 18). The forward observer transmits a command assumed to be: "From base point, left 500 yards, and 1,000 yards." The target is located, as shown in Fig. 19. The shift from base deflection (see Fig. 20) is determined to be: "23 rings; base deflection, left 120 mils; elevation 830 mils."

*Recording concentration*

At the completion of a fire mission, the forward observer may request record concentration. The computer records the concentration on plotting sheet I, by drawing a small circle around the final point . . . representing the target and assigning it a concentration number (see Fig. 22). He erases all other points plotted while firing the mission. He then reports azimuth and range and firing data of the concentration number in accordance with approved procedure. Recording concentrations can be repeated as many times as required, as long as the platoon remains in one position. An example of how a fire control chart looks after recording a group of concentration points such as illustrated in Figs. 21 to 24 inclusive.

Having now described both the apparatus and the process of this invention, I claim:

1. An artillery fire control chart for plotting the fire of artillery munitions having predetermined firing characteristics; said munitions including an artillery weapon, shells adapted to be fired from said weapon and propellant powder rings adapted to serve as charges in firing said weapon; said chart having a plurality of pivotally connected elements comprising, a plotting sheet having at least one of its sides adapted to be readily marked with a pencil, an opaque sensing fan movably mounted beneath said plotting sheet provided with a block of artillery squares for indicating vertical and horizontal distances between spaced apart points on said sheet and a plurality of elongated, transparent strips each of said strips having a plurality of shell impact curves whereby, when one of said shells is to be fired in accordance with given firing data, the location of the shell impact on the field of fire of said weapon may be plotted on said chart, each of said elements being pivotally connected together through a perforation in the lower portion of the element indicating the location of said weapon in its field of fire; said plotting sheet having an arcuate shaped upper edge portion partially encircling its perforation, and provided with an arcuate azimuth scale, said scale having one hundred mil and ten mil graduation marks to aid in determining the azimuth of the location of a firing point in the field of fire of the said weapon represented by a point on said sheet. Said impact curves of said strips each being formed, located, calibrated and provided with ballistic data in a manner adapted to indicate on said chart, the range and azimuth of said firing point and the number of propellant powder rings which are to be used in firing said shell at said firing point, each of said strips also having at its upper end portion, a straight shift indicator line representing the line of sight of said weapon.

2. The chart of claim 1 in which an opaque baseboard is secured to, but apart from, said plotting sheet and the said sensing fan is pivotally connected to the plotting sheet between said sheet and said baseboard.

3. The chart of claim 1 in which the chart is provided with an opaque baseboard secured to but apart from said plotting sheet and said sensing fan is pivotally connected to the plotting sheet intermediate of said sheet and said baseboard and said baseboard and said sheet have substantially the same shape and size.

4. A chart of claim 1 having a separate arcuate plate member having imprinted thereon an azimuth scale shorter than, but of the same curvature as, the azimuth scale of the plotting sheet, said member being adapted to be slid over the upper edge portion of said plotting sheet in a manner whereby its azimuth scale will overlap the upper portion of said sheet and indicate the deflection in mils between two points on the azimuth scale of the plotting sheet.

EPHRIAM L. SAWYER.

REFERENCES CITED

The following references are of record in the file of this patent:

UNITED STATES PATENTS

| Number | Name | Date |
|---|---|---|
| 1,493,225 | Ammann | May 6, 1924 |
| 1,609,571 | Olson | Dec. 7, 1926 |
| 1,656,786 | Gahan | Jan. 17, 1928 |
| 2,112,858 | McCormick | Apr. 5, 1938 |
| 2,174,106 | Houck | Sept. 26, 1939 |
| 2,216,172 | Graham | Oct. 1, 1940 |

FOREIGN PATENTS

| Number | Country | Date |
|---|---|---|
| 120,247 | Great Britain | Mar. 18, 1918 |